United States Patent

Girod et al.

Patent Number: 5,854,858
Date of Patent: Dec. 29, 1998

[54] IMAGE SIGNAL CODER OPERATING AT REDUCED SPATIAL RESOLUTION

[76] Inventors: Bernd Girod, Köhlerhof 6, 91080 Spardorf, Germany; Staffan Ericsson, 61 Longwood Ave., Brookline, Mass. 02146

[21] Appl. No.: 504,631

[22] Filed: Jun. 7, 1995

[51] Int. Cl.⁶ ..................................... G06K 9/36
[52] U.S. Cl. ........................... 382/250; 382/248
[58] Field of Search .................... 382/250, 251, 382/233, 264, 248, 236; 348/416, 424, 412, 420; 398/432, 433

[56] References Cited

U.S. PATENT DOCUMENTS

| | | | |
|---|---|---|---|
| 4,553,165 | 11/1985 | Bayer | 358/463 |
| 5,089,889 | 2/1992 | Sugiyama | 348/415 |
| 5,398,078 | 3/1995 | Masuda et al. | 348/416 |
| 5,544,091 | 8/1996 | Watanabe | 364/725 |
| 5,552,829 | 9/1996 | Kim et al. | 348/420 |
| 5,557,330 | 9/1996 | Astle | 348/420 |
| 5,592,569 | 1/1997 | Li | 382/253 |

Primary Examiner—Yon J. Couso
Attorney, Agent, or Firm—Wolf, Greenfield & Sacks, P.C.

[57] ABSTRACT

An image processing system operates at reduced resolution to reduce computational complexity while remaining fully compatible with full resolution decoders. A video input signal is subsampled and encoded at the resulting lower resolution. The encoded signal is filled with zero terms to produce an encoded signal having the same number of terms as a full resolution encoded signal. In a motion-compensated hybrid coder, the decoder section also includes a subsampling system, so that the reconstructed video signal is produced at the same resulting lower resolution. The encoder section and the decoder section are each inverse functions of the other, eliminating a drift problem associated with prior systems.

20 Claims, 7 Drawing Sheets

IMAGE SIGNAL CODER OPERATING AT REDUCED SPATIAL RESOLUTION

FIELD OF THE INVENTION

The present invention relates generally to the field of digital image processing systems, in particular image processing systems embodied in combinations of general or special purpose hardware and software. More specifically, the present invention relates to implementations of the Discrete Cosine Transform suitable for embodiment as a software program for processing moving images, i.e. video, executing on a general purpose computer.

BACKGROUND OF THE INVENTION

In the context of the present invention, an image is a two-dimensional visual representation, wherein each point within the image may have associated therewith one or more characteristics. For example, for a monochrome image, each point may have associated therewith a luminance value. For a color image, each point may have associated therewith a red intensity, a blue intensity and a green intensity. Common image presentation technologies include printed photographic still images, movie images, television images, and computer images. Computer technology has now begun to open whole new areas of image presentation, such as high realism video games, electronic books, and others yet to reach commercialization. These later forms of image presentation all use digital images. That is, images which are stored in digital, and usually binary, form.

Digital image signals are formed by first dividing a two-dimensional image into a grid. Each picture element, or pixel, in the grid has associated therewith a number of visual characteristics, such as brightness and color. These characteristics are converted into numeric form. The digital image signal is then formed by assembling the numbers associated with each pixel in the image in a sequence which can be interpreted by a receiver of the digital image signal.

One reason that these emerging technologies have not appeared sooner is that uncompressed digital image signals contain vast amounts of information, requiring vast quantities of storage space. Furthermore, moving uncompressed digital image signals from one user to another requires a large communication bandwidth to accommodate the large amount of information in a reasonable period of time. Suppose that for a monochromatic (e.g., black and white) image 256 shades of gray are sufficient to represent a uniform luminance scale ranging from black to white. Each pixel occupies eight bits (binary digits) of storage. Thus an image created for display on a typical personal computer screen having a resolution of 640×480 pixels occupies a total of 307,200 bytes. That is the storage equivalent of approximately 100 pages of single-spaced text. Extrapolating, a color image can occupy three times that storage space.

In view of the tremendous pressure that the use of images places on storage requirements, there has been a great deal of research into image compression techniques. A standard known as ISO 10918-1 JPEG Draft International Standard/ CCITT Recommendation T.81 has emerged as a result of this research. The standard is reproduced in Pennebaker and Mitchell, "JPEG: Still Image Data Compression Standard," New York, Van Nostrand Reinhold, 1993, incorporated herein by reference. One compression technique defined in the JPEG standard, as well as other emerging compression standards, is Discrete Cosine Transform (DCT) coding. Images compressed using DCT coding are decompressed using an inverse transform known as the inverse DCT (IDCT). An excellent general reference on DCTs is Rao and Yip, "Discrete Cosine Transform," New York, Academic Press, 1990, incorporated herein by reference. It will be assumed that those of ordinary skill in this art are familiar with the contents of the above-referenced books.

It is readily apparent that if still images present storage problems for computer users and others, motion picture storage problems are far more severe, because full-motion video may require up to 60 images for each second of displayed motion pictures. Therefore, motion picture compression techniques have been the subject of yet further development and standardization activity. Important standards include ITU-T Recommendations H.261, H.262 and H.263. The ITU-T Recommendation H.262 is commonly known as the MPEG standard, after the Motion Picture Experts Group which developed it. These standards rely in part on DCT coding and IDCT decoding.

The DCT is applied, in accordance with these standards, to each image or video frame in a blockwise fashion. Block sizes that are powers of 2 (2, 4, 8, 16, etc.) are particularly suitable for computationally attractive, fast algorithms for the DCT. In practice, a block size of 8×8 is almost always used today for image coding.

It will be apparent to those skilled in this art that the DCT is closely related to the discrete Fourier transform (DFT). In fact, the DCT can be interpreted as a DFT of the extended block of size 2N×2N, which is obtained by mirroring the original N×N block at its horizontal and its vertical edge. Thus, the DCT coefficient can be interpreted as spectral components of an image block. Low order DCT coefficients correspond to low frequency components in the signal, while high order DCT coefficients correspond to high frequency components.

Given that processing digital image signals using DCT coding provides the desired degree of compression, the pressure on industry is now to find the fastest method by which to perform the DCT and IDCT. As in the field of compression generally, research is highly active and competitive in the field of fast DCT and fast IDCT implementation. Researchers have made a wide variety of attempts to exploit the strengths of the hardware intended to implement the DCT and IDCT by exploiting symmetries and other properties found in the transform and inverse transform, as it is used in practical systems. For example, the Applicants' own method and apparatus disclosed in their U.S. patent application Ser. No. 08/332,535, filed Oct. 31, 1994, pending, incorporated herein by reference, exploits the statistical properties of the transformed signal.

Sometimes, as discussed therein, the image signal does not require the full spatial resolution that is provided by a DCT based coding scheme. This is often true for the color difference signals. In many coding standards, the color difference signals are transmitted at nominally half the horizontal and vertical resolution compared to the luminance signals. For many natural scenes, a spatial resolution of one quarter of that of the luminance signal, both horizontally and vertically, would be sufficient. Consequently, the bandwidth of the color difference signals can be reduced by filtering, and the higher order coefficients of a DCT applied to this signal would be very small or even zero.

The numbers of computations required to perform a DCT increases with its order N. For N a power of 2, the computational complexity (i.e. the number of multiplications and additions) of the fastest DCT algorithms is proportional to N×log(N). Hence, a one-dimensional DCT of order N=8 is roughly 3 times as complex as a DCT of order N=4. For a 2D DCT, an 8×8 DCT is roughly 9 times as complex as a DCT of order 4×4.

It is desired to implement these functions in software, because to do so reduces hardware costs. Specialized hardware embodying a software DCT/IDCT could be made more flexible than an all-hardware implementation. Software which could run on a conventional PC, without special hardware, could eliminate the cost of such hardware entirely. This may be especially advantageous in fields such as video teleconferencing, where the participants are already likely to have access to PCs. A video teleconference system could be implemented at a fraction of the cost of current special-purpose hardware. Unfortunately, fast software DCT and IDCT implementations continue to suffer, relative to their hardware cousins, due to the unusual demands placed on the computer by the required arithmetic operations, particularly multiplications.

SUMMARY OF THE INVENTION

It is one object of this invention to reduce the computational requirements for a DCT coder by filtering and subsampling the original image signal and utilizing a DCT of lower order, when the full nominal resolution provided by a coding standard (and assumed by the decoder) is not required. Other objects and advantages of the present invention will become apparent on reading the following summary and descriptions.

In accordance with one aspect of the invention, there is provided a digital signal encoder. The encoder includes a subsampling system for receiving a digital image signal and producing a subsampled signal at an output; a signal transformer operating at a reduced spatial resolution corresponding to the subsampled signal, having an input connected to receive the subsampled signal and an output carrying a transformed signal; and a quantizer having an input connected to receive the transformed signal and an output carrying a quantized output signal. The signal transformer may perform, for example a 4×4 discrete cosine transform (DCT), or may perform other signal transforms, as mentioned below.

In accordance with another aspect of the invention, there is provided a motion-compensated digital signal encoder. The motion-compensated digital signal encoder is of a hybrid encoder type, comprising a first subsampling system for receiving a digital image signal and producing a subsampled signal at an output; a subtractor having a first input connected to receive the subsampled signal, a second input connected to receive a subsampled prediction signal and an output carrying a difference signal representative of the difference between the signals received at the first and second inputs; a signal transformer operating at a reduced spatial resolution corresponding to the subsampled signal, having an input connected to receive the subsampled signal and an output carrying a transformed signal; a quantizer having an input connected to receive the transformed signal and an output carrying a quantized output signal; a decoder having an input connected to receive the quantized output signal and an output carrying a prediction signal; and a second subsampling system having an input connected to receive the prediction signal and an output carrying the subsampled prediction signal. Here, the transform performed may also be a 4×4 DCT, for example. In that case, the decoder may include an inverse transform system, for performing an inverse discrete cosine transform (IDCT).

In accordance with yet another aspect of the present invention, a method of processing video signals in a computer executing a software program, may include the steps of:

receiving a video input signal at an original resolution;

low-pass filtering the received signal;

subsampling the low-pass filtered signal to produce a lower resolution signal;

performing a transform on the lower resolution signal;

quantizing the transformed signal; and producing a quantized signal at the original resolution by filling the quantized signal with zeros.

Another method of processing video signals in a computer executing a software program, in accordance with yet another aspect of the invention includes the steps of:

receiving a video input signal at an original resolution;

low-pass filtering the received signal;

subsampling the low-pass filtered signal to produce a lower resolution signal;

forming a difference signal between the lower resolution signal and a lower resolution prediction signal;

performing a transform on the difference signal formed;

quantizing the transformed signal;

producing a quantized signal at the original resolution by filling the quantized signal with zeros;

performing an inverse transform on the quantized signal at the original resolution;

adding to the inverse transformed signal a prediction signal to form a predictor input signal;

forming the prediction signal from the predictor input signal; and subsampling the prediction signal to form the lower resolution prediction signal.

BRIEF DESCRIPTION OF THE DRAWINGS

In the drawings, in which like reference numerals denote like elements.

DETAILED DESCRIPTION

The invention will be better understood by reading the following detailed description of various embodiments thereof, in connection with the Figures.

Figure 1A:
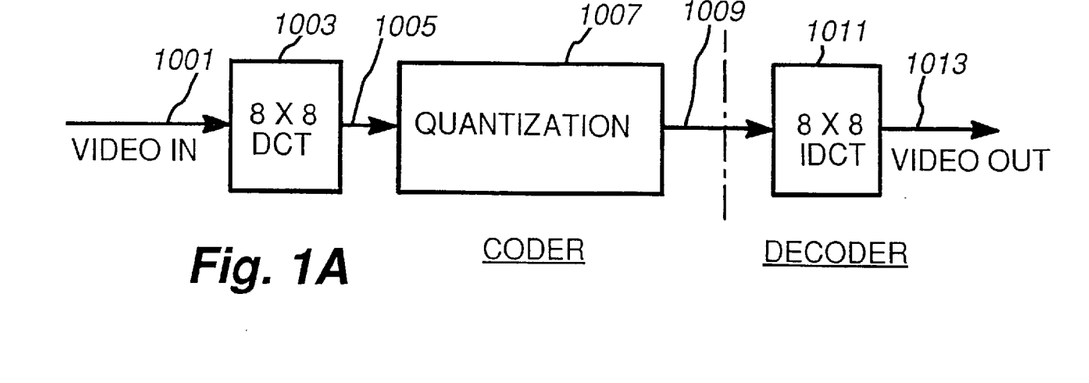
FIG. 1A is a block diagram of an intraframe encoder/decoder system of the prior art.

Conventionally, an intraframe encoder, as shown in FIG. 1A, receives a video signal 1001, performs an 8×8 DCT 1003 and quantizes 1005 the resulting transform coefficients 1007. The quantized transform coefficients are encoded and transmitted as signal 1009. At the decoder, an 8×8 IDCT 1011 is applied to the received signal 1009, to reconstruct the video signal, producing video out 1013.

Figure 1B:
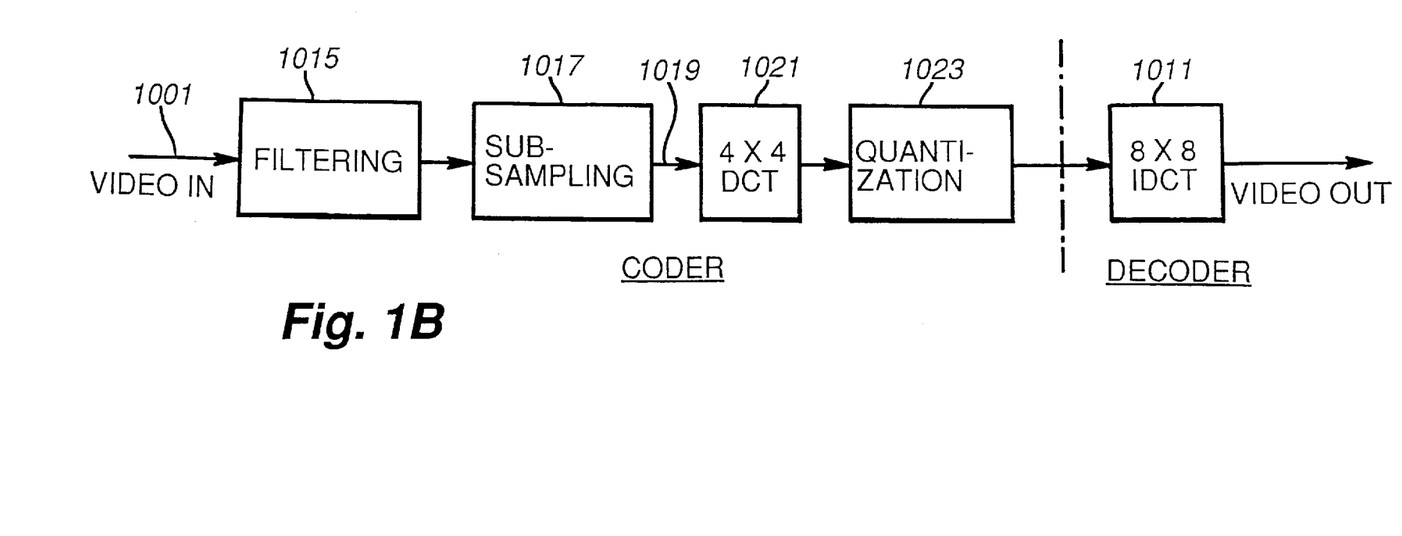
FIG. 1B is a block diagram of an intraframe encoder/decoder system in accordance with one aspect of the present invention.

Many video input signals and many applications do not require that the full spatial resolution of the signal be encoded, to produce satisfactory video out upon subsequent decoding. If the full spatial resolution of the video signal is not required, computation can be saved as shown in FIG. 1B. The video signal 1001 is spatially filtered 1015 and subsampled 1017, for example by 2:1 in both horizontal and vertical direction. It will be readily apparent to those skilled in this art how the following discussion may be modified if a ratio other than 2:1 is used. The subsampled signal 1019 is transformed 1021 in a blockwise fashion, using a 4×4 DCT, rather than an 8×8 DCT. The 4×4 blocks in the subsampled image coincide with the 8×8 blocks that would have been used in the full resolution image. For example, the block may include every other pixel in each of the horizontal and the vertical directions. The resulting 4×4 transform coefficients are then encoded as the 4×4 lowest order transform coefficients of the 8×8 block. The remaining 48 coefficients of the 8×8 block not produced as part of the 4×4 DCT are set to, and encoded as, zero, for example by quantizer 1023. The signal transformer, which here performs a 4×4 DCT may be implemented using any known means, including specialized hardware or one of the methods and apparatus disclosed in U.S. patent application Ser. No. 08/332,535 indicated above. The decoder in FIG. 1B is identical to that in FIG. 1A. Since the 4×4 DCT is computationally much less demanding than an 8×8 DCT, the embodiment of this aspect of the invention, as shown in FIG. 1B is advantageous when full spatial resolution is not required.

The filter 1015 applied before subsampling 1017 in FIG. 1B should be a lowpass filter with a half-pel and half-line delay. The simplest such filter has the 2D impulse response:

$$\begin{vmatrix} 0.25 & 0.25 \\ 0.25 & 0.25 \end{vmatrix} \quad (1)$$

Thus, after subsampling 1017, each sample is the average of 4 samples of the original image. This filter 1015 is readily embodied in specialized hardware or in a software program executing on general purpose hardware by those skilled in the art.

The above discussion has applied to intraframe encoder/decoder systems, suitable for use in processing still images. Next, interframe predictive encoder/decoder systems suitable for encoding moving images, i.e. video, are discussed.

Figure 2:
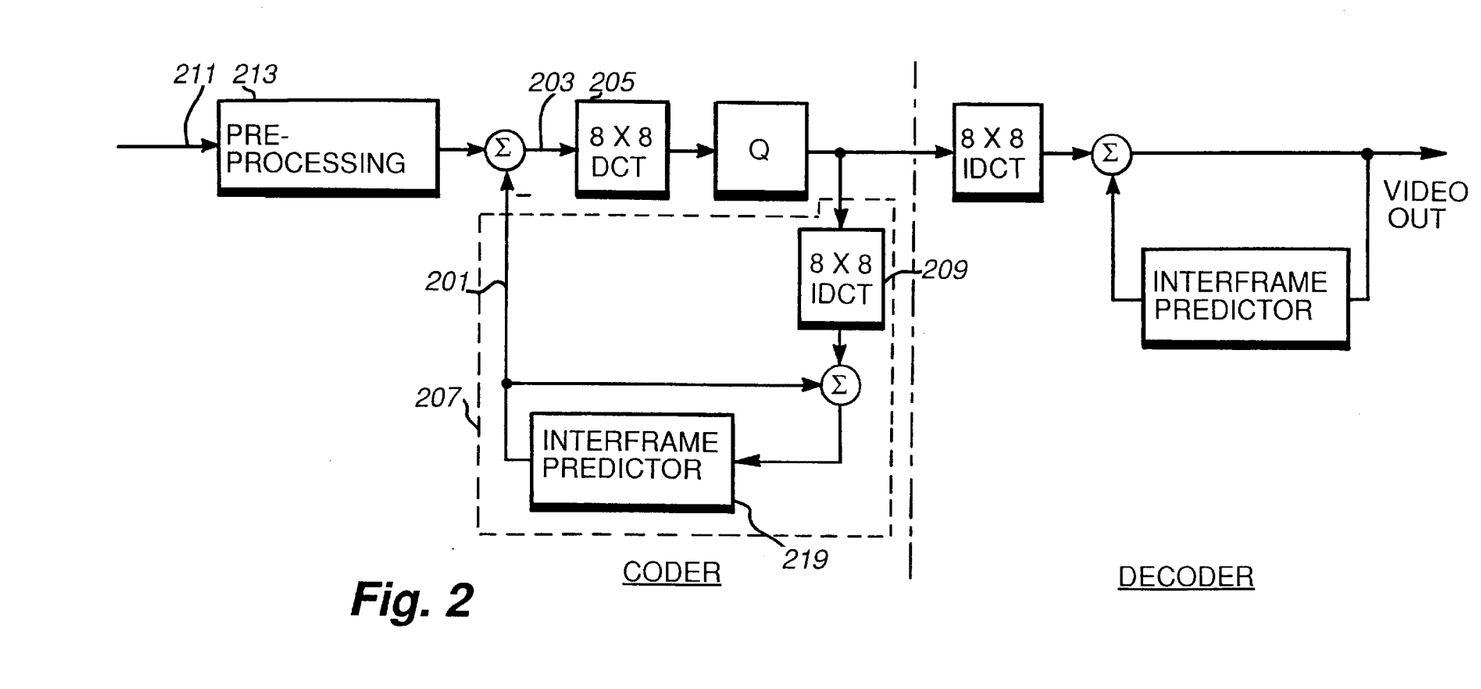
FIG. 2 is a block diagram of a predictive encoder/decoder system in accordance with another aspect of the present invention.

Often, the DCT is used in the context of a motion-compensating hybrid coder as shown in FIG. 2. A prediction signal 201 is formed based on the previous frame, and the prediction error 203 is encoded by an 8×8 DCT 205. The encoder contains a replica 207 of the decoder, including an 8×8 inverse discrete cosine transform (IDCT) 209. Such coding schemes are used in the ITU-T recommendations H.261, H.262, and H.263, mentioned above.

Conventionally, before the coder, the video signal 211 passes through one or more preprocessing stages 213. Preprocessing operations 213 might include noise reduction, image sharpening, contrast and color correction or gamma predistortion. In the system in FIG. 2, these operations would be applied to full resolution video signals 211.

Figure 3:
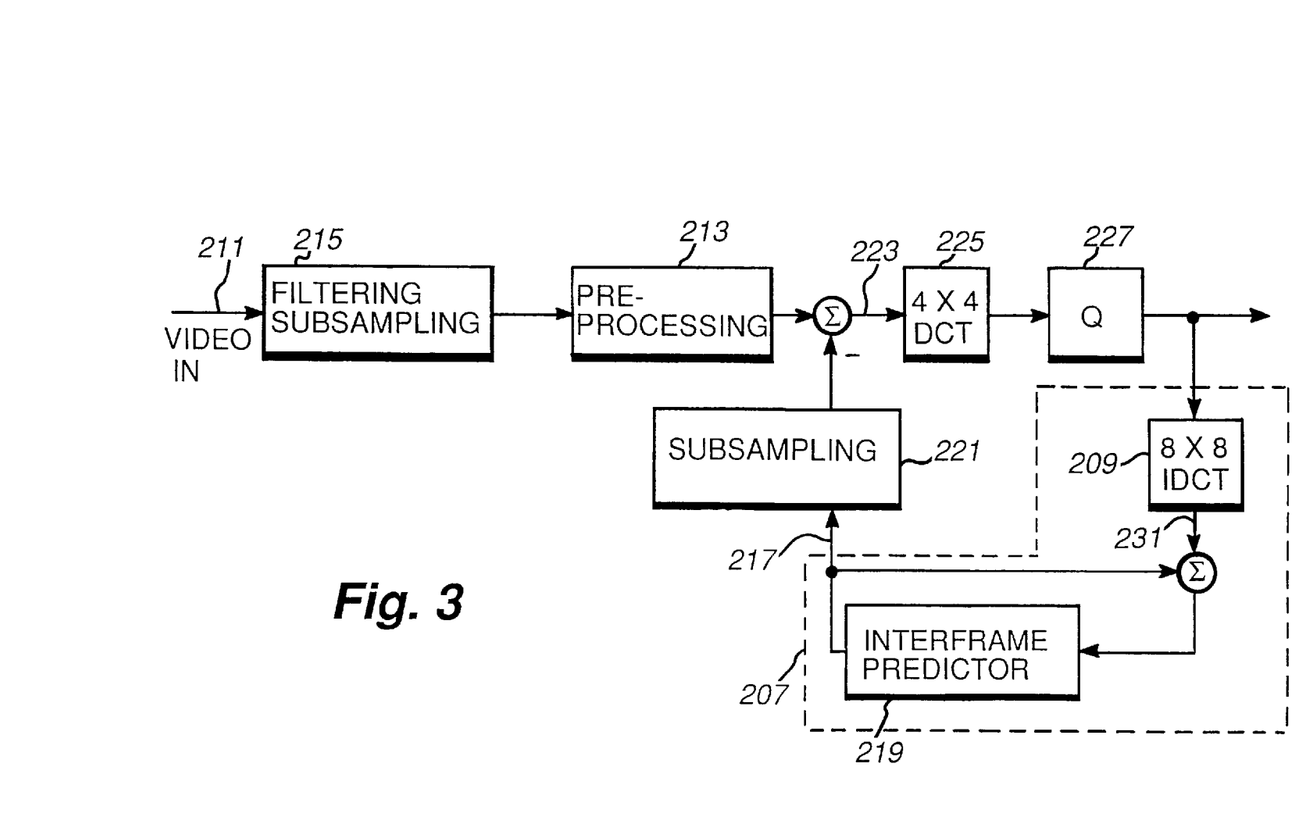
FIG. 3 is a block diagram of a predictive encoder/decoder system in accordance with yet another aspect of the present invention.

If the full resolution of the video signal is not required, the coder in accordance with another aspect of the invention, as shown in FIG. 3 can be used. Before preprocessing 213, the video signal 211 is filtered and subsampled 215, for example by 2:1 horizontally and vertically. Further processing, such as the preprocessing stage 213, then proceeds at a reduced resolution The prediction signal 217 formed by the interframe predictor 219 is subsampled 2:1 as well. The prediction error signal 223 (at reduced resolution) is then transformed by a 4×4 DCT 225, as outlined in the first aspect of the invention. The 4×4 blocks in the subsampled image coincide with the 8×8 blocks, that would have been used in the full resolution image. The resulting 4×4 transform coefficients are then encoded as the 4×4 lowest order transform coefficients of the 8×8 block. As before, the remaining 48 coefficients of the 8×8 block not included in the 4×4 transformation are set to, and encoded as, zero, for example in quantizer 227.

An 8×8 IDCT 209 is applied in the coder of FIG. 3, thus producing a full resolution quantized prediction error signal 231 at its output. Effectively, the 8×8 IDCT 209 interpolates the subsampled prediction error 223 at the input of the 4×4 DCT 225. The interframe predictor 219 then works at full resolution. The coder therefore still contains an exact replica 207 of the decoder. The decoder for the coder shown in FIG. 3 is identical to the decoder in FIG. 2, thus the reduced resolution coder is fully compatible with the conventional decoder.

The system shown in FIG. 3 saves computation in three respects:

The preprocessing stage 213 processes one quarter of the samples.

The prediction error computation of the interframe predictor 219 processes, i.e. performs subtractions on, only one quarter of the samples.

A 4×4 DCT is used instead of an 8×8 DCT.

The spatial resolution provided by the coder is, of course, only one half of the full resolution horizontally and vertically. This method and apparatus is particularly suitable for the encoding of the color difference signals Cr and Cb in the context of the H.261 coding standard. There is little subjective degradation due to the reduced resolution of the color difference signals. On the other hand, the reduced resolution in the preprocessing stage allows the use of sophisticated preprocessing algorithms otherwise prohibited by their computational complexity at full resolution.

Above, 2:1 subsampling of the input signal both horizontally and vertically has been used as an example. In general, any combination of subsampling factors horizontally and vertically is possible (for example: 2:1 horizontally, 4:1 vertically). As indicated above, one of ordinary skill in this art would know that the relative sizes of the resulting blocks would be adjusted accordingly.

A variety of useful modifications to the invention are possible and contemplated by the inventors. Various filters could be used before subsampling, including no filters at all. Other transforms, such as the Slant transform, the Walsh Hadamard transform, the Haar transform, or the Lapped Orthogonal transform could be substituted for the 8×8 DCT transform relative to which the invention has been described. The invention could be applied selectively, i.e., certain blocks are represented and processed at full resolution, while others are represented and processed at reduced resolution.

Figure 4:
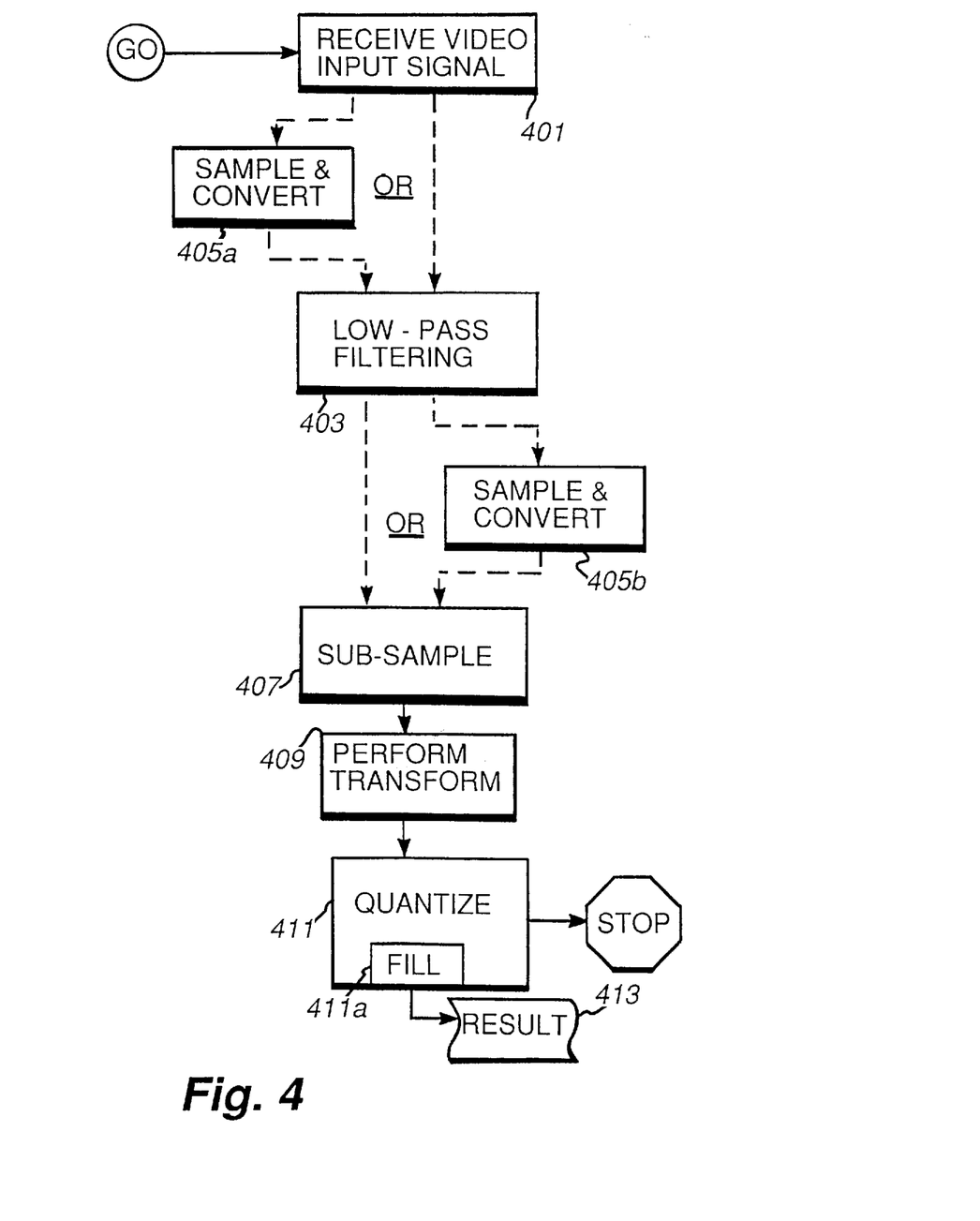
FIG. 4 is a flow chart of a method embodying aspects of the invention.
Figure 6:
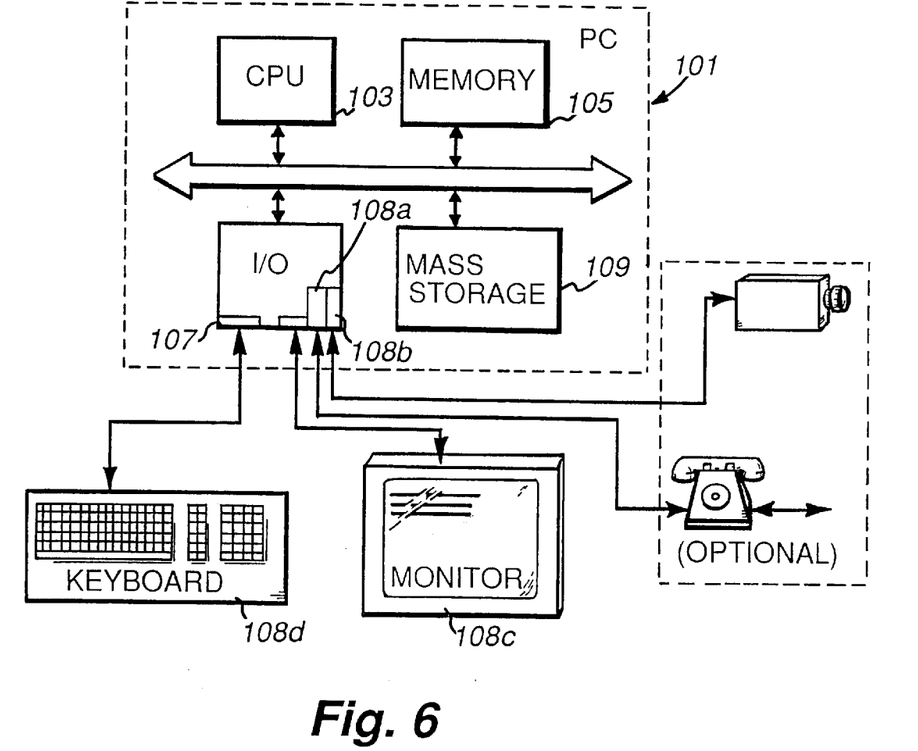
FIG. 6 is a block diagram of a typical general purpose computer system in which the invention may be practiced.

A method of processing a video signal using an intraframe coder in accordance with aspects of this invention is now described in connection with FIG. 4. The method may be practiced using specialized hardware, or using a software program executing on a general purpose computer, such as illustrated in FIG. 6 and described below.

A video input signal is first received, step 401. The video input signal may be analog or digital in origin. High frequency components of the video input signal are removed by low-pass filtering, step 403. If the video input signal is received in analog form, this low-pass filtering step may be performed either before or after sampling and conversion (steps 405a or 405b) of the analog signal to digital form. If the video input signal is received in digital form, the low-pass filtering step 403 may be embodied in a software program executing on a general purpose computer. In this case, the video input signal is stored in memory, and the filtering (step 403) is performed by selectively altering the contents of the memory in accordance with known digital filtering techniques. After the high frequency components of the video input signal have been removed or reduced by low-pass filtering (step 403), the video input signal may be sub-sampled (step 407), without losing significant additional information. Sub-sampling (step 407) and its result is described in detail above. The sub-sampled signal, which may reside in memory in the case of an embodiment using a general purpose computer, then undergoes a 4×4 discrete cosine transform, step 409, and quantization, step 411. These steps (steps 409 and 411) may be combined in some embodiments. The coefficients of the 4×4 DCT correspond to the low order coefficients of an 8×8 DCT covering the same image area. Thus, in order to maintain compatibility with conventional decoders, during these last steps, and preferably as part of quantization (step 411), the coefficients of the 8×8 DCT not produced by the 4×4 DCT are filled in (step 411a) as zeros. The 64 coefficients of the 8×8 DCT thus produced are the result 413 of this method.

In accordance with other aspects of the invention, and with some modification, the method may be applied to interframe predictive coders, as well as intraframe coders. This is illustrated in the flow chart of FIGS. 5A and 5B.

Figure 5A:
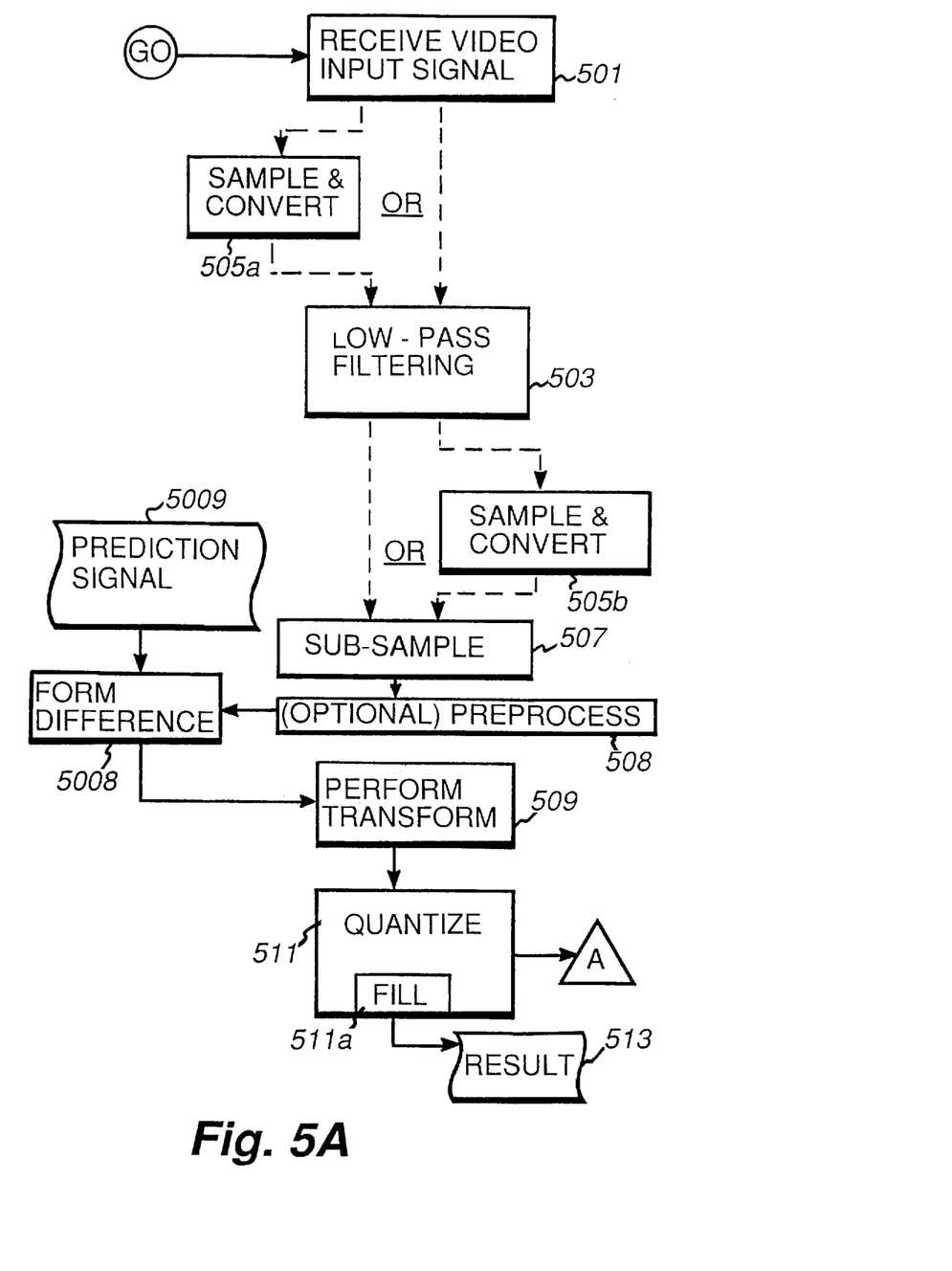
FIGS. 5A and 5B are a flow chart of another method embodying aspects of the invention.
Figure 5B:
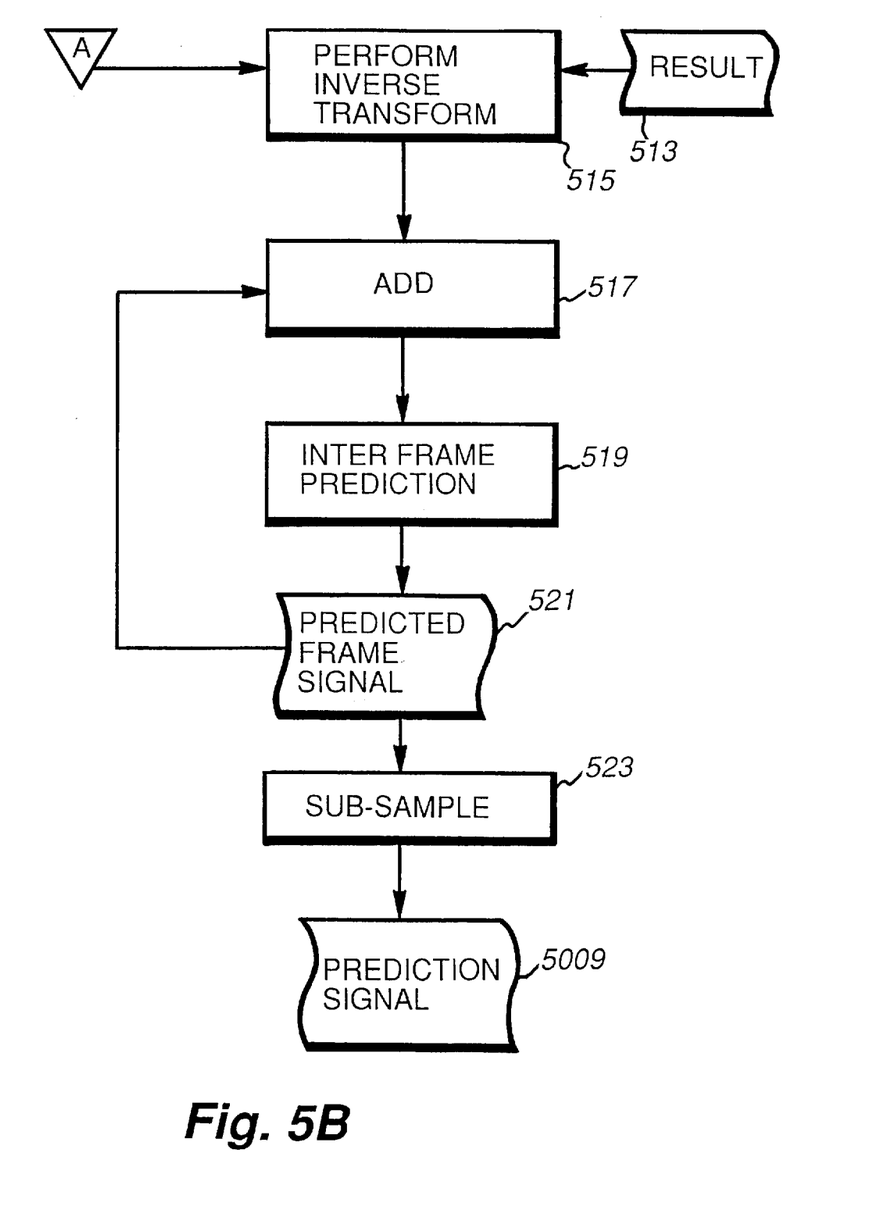

Again, a video input signal is first received, step 501. The video input signal may be analog or digital in origin. High frequency components of the video input signal are removed by low-pass filtering, step 503. If the video input signal is received in analog form, this low-pass filtering step 503 may be performed either before or after sampling and conversion (steps 505a or 505b) of the analog signal to digital form. If the video input signal is received in digital form, low-pass filtering step 503 may be embodied in a software program executing on a general purpose computer. In this case, the video input signal is stored in memory, and the filtering is performed by selectively altering the contents of the memory in accordance with known digital filtering techniques. After the high frequency components of the video input signal have been removed or reduced by low-pass filtering (step 503), the video input signal may be sub-sampled (step 507), without losing significant additional information. Sub-sampling (step 507) and its result is described in detail above. The sub-sampled signal, which may reside in memory in the case of an embodiment using a general purpose computer, may optionally be preprocessed in step 508, using a variety of filters. Then, after forming a difference signal in step 5008 by subtracting a similarly sub-sampled prediction signal 5009, the difference signal undergoes a 4×4 discrete cosine transform (step 509) and quantization (step 511). The coefficients of the 4×4 DCT correspond to the low order coefficients of an 8×8 DCT covering the same image area. Thus, in order to maintain compatibility with conventional decoders, during these last steps, and preferably as part of quantization (step 511), the coefficients of the 8×8 DCT not produced by the 4×4 DCT are filled in (step 511a) as zeros. The 64 coefficients of the 8×8 DCT thus produced are the result 513 of this method.

In order to produce the subsampled prediction signal 509 needed at the step of subtracting (step 5008), the following additional steps are performed. An 8×8 inverse DCT (IDCT) (step 515) is performed on the result signal, to form a full-resolution video signal. A predicted frame signal is added (step 517) to the full-resolution video signal to form an input to the interframe predictor. An interframe prediction (step 519) is performed, which forms the predicted frame signal 521 for the next frame. The predicted frame signal 521 is also sub-sampled in step 523 to form the subsampled prediction signal 5009, referred to above.

The above-described methods and apparatus may be embodied in a general purpose computer executing a software program, as indicated above. The embodiments and variations disclosed herein are all intended to be implemented in the form of software running on a personal computer (PC), configured substantially as shown in FIG. 6. However, the specific hardware configuration is not a limitation of the present invention. Indeed, the invention could be embodied in software running on other types of general-purpose computers, or embodied in special-purpose integrated circuits. However, the PC configuration of FIG. 6 illustrates the general hardware parameters suitable for practicing the invention, without unduly complicating the detailed explanation thereof.

Referring to FIG. 6, the PC 101 includes a central processing unit (CPU) 103, memory 105, input/output (I/O) system 107 and mass storage 109. These are now briefly discussed, before turning to the software of the present invention.

The CPU 103 should preferably be of a current, high-performance type such as the Intel 486 family, the Intel Pentium family, a Digital Equipment Corp. Alpha, a MIPS R4000 or Motorola 68040 devices. The minimum processing speed is not a critical parameter, but may be chosen by the skilled designer. Naturally, differences in processing speed will have a direct effect on the performance of different systems.

Having sufficient quantities of memory 105 available in the PC 101 will also have a direct effect on system performance. It is desirable to be able to hold sufficient quantities of a digital input signal and a digital output signal, as well as certain program structures, such as look-up tables used in transforming the input signal into the output signal. The PC 101 therefore preferably includes several megabytes (M bytes) of RAM, as well as other forms of memory, such as operating system ROM, which is not important to this description. (1M bytes=1,048,576 bytes.)

Data and digital signals of various kinds may be passed into or out of PC 101 through I/O system 107. An extremely wide variety of devices may be included in I/O system 107. The devices of I/O system 107 allow digital image signals to be received into or transmitted out of PC 101. For example, I/O system 107 may include a modem 108a for sending digital signals or receiving digital signals or data from remote devices and computers. Such digital signals could include digital image signals. Another possible I/O device is a frame grabber 108b, which could be used to introduce into PC 101 television or video images which have been converted to digital form. Of course, I/O system 107 may include such conventional I/O devices as a monitor 108c, keyboard 108d and printer (not shown), which may be desirable.

Programs, data and digital signals which need to be stored on a more permanent basis than permitted by the RAM portion of memory 105 are stored in a mass storage device 109. The mass storage device 109 may be a hard disk, an optical disk, a CD-ROM or any permanent storage device having similar characteristics to the devices mentioned.

Image signals are received into the PC 101 through one of the devices of I/O system 107. Once inside the PC 101, the image signals will have been converted to digital form. That is, they are digital image signals. In this embodiment, it is presumed that the digital image signals are to be either stored in a mass storage device 109 or transmitted to another location via one of the I/O devices of the 1/0 system 107. It is further presumed in this embodiment that subsequently the digital image signals are to be used to operate a display device, for example the monitor 108c, to display the image in its customary form. One example of this is where the PC 101 is part of a conferencing network where images are to be exchanged, stored and displayed on a plurality of such machines.

When the invention is embodied as a software program executing on a PC101, various program steps are carried out, having the CPU103 perform various operations on values in RAM, received by or output through the various devices of I/O system 107, etc. For example, the digital image signals received for processing as described above may be held as values in RAM.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto.

What is claimed is:

1. A motion-compensated digital signal encoder compatible with a decoder have a predetermined spatial resolution defined by a predetermined number of transform coefficient's in each transform block, comprising:

a spatial lowpass filter having an input adapted to receive a digital image signal and producing a filtered image signal at an output;

a first subsampling system operating at a 2:1 ratio horizontally and vertically, for receiving the filtered image signal and producing a subsampled signal at an output;

a subtractor having a first input connected to receive the subsampled signal, a second input connected to receive a subsampled prediction signal and an output carrying a difference signal representative of the difference between the signals received at the first and second inputs;

a signal transformer operating at a reduced spatial resolution defined by a number smaller than the predetermined number of transform coefficients in each transform block, the reduced spatial resolution corresponding to the subsampled signal, having an input connected to receive the subsampled signal and an output carrying a transformed signal;

a quantizer having an input connected to receive the transformed signal and an output carrying a quantized output signal;

means for encoding as zero those transform coefficients of a full-resolution transform corresponding to the reduced spatial resolution transform, but not computed by the signal transformer;

a decoder having an input connected to receive the quantized output signal and an output carrying a prediction signal; and a second subsampling system having an input connected to receive the prediction signal and an output carrying the subsampled prediction signal; wherein, the signal transformer performs a 4×4 transform.

2. The digital signal encoder recited in claim 1, wherein the signal transformer performs a Slant transform.

3. The digital signal encoder recited in claim 1, wherein the signal transformer performs a Walsh Hadamard transform.

4. The digital signal encoder recited in claim 1, wherein the signal transformer performs a Haar transform.

5. The digital signal encoder recited in claim 1, wherein the signal transformer performs a Lapped Orthogonal transform.

6. The digital signal encoder recited in claim 1, wherein the digital signal encoder is selectively applied to some digital image signal blocks.

7. The digital signal encoder recited in claim 1, wherein the lowpass filter includes a half-pel delay and a half-line delay.

8. The digital signal encoder recited in claim 7, wherein the lowpass filter has a 2D impulse response:

$$\begin{vmatrix} 0.25 & 0.25 \\ 0.25 & 0.25 \end{vmatrix}.$$

9. The digital signal encoder recited in claim 1, wherein the encoder is specialized hardware.

10. The digital signal encoder recited in claim 1, wherein the encoder is a software program executing in general purpose hardware.

11. The digital signal encoder recited in claim 1, further comprising:

a preprocessor connected to receive the subsampled signal from the first subsampling system and having an output connected to the first input of the subtractor, applying the subsampled signal thereto after preprocessing.

12. The digital signal encoder recited in claim 1, wherein the interframe predictive decoder performs substantially the same decoding as performed by the digital signal decoder having the predetermined spatial resolution.

13. The digital signal encoder recited in claim 1, wherein the signal transformer performs a discrete cosine transformer.

14. A method of processing video signals in a computer executing a software program, comprising the steps of:

receiving a video input signal at an original resolution;

filtering the video input signal with a spatial lowpass filter;

subsampling the filtered input signal at a 2:1 ratio horizontally and vertically, to produce a lower resolution signal;

forming a difference signal between the lower resolution signal and a lower resolution prediction signal;

performing a 4×4 transform on the difference signal formed;

quantizing the transformed signal;

producing a quantized signal at the original resolution by filling the quantized signal with zeros;

performing an inverse transform on the quantized signal at the original resolution;

adding to the inverse transformed signal an original resolution prediction signal to form a predictor input signal;

forming the original resolution prediction signal from the predictor input signal; and subsampling the original resolution prediction signal to form the lower resolution prediction signal video signal.

15. The method of claim 14, wherein the transform of the step of performing is a discrete cosine transform.

16. The method of claim 14, wherein the transform of the step of performing is a Slant transform.

17. The method of claim 14, wherein the transform of the step of performing is a Walsh Hadamard transform.

18. The method of claim 14, wherein the transform of the step of performing is a Haar transform.

19. The method of claim 14, wherein the transform of the step of performing is a Lapped Orthogonal transform.

20. The method of claim 14, further comprising the step of:

preprocessing at the lower resolution, the lower resolution signal after subsampling.

* * * * *